United States Patent
Fukasawa et al.

(10) Patent No.: US 10,693,128 B2
(45) Date of Patent: Jun. 23, 2020

(54) ELECTRODE FOR NONAQUEOUS ELECTROLYTE BATTERY, NONAQUEOUS ELECTROLYTE BATTERY INCLUDING THE SAME, AND BATTERY PACK

(71) Applicant: Kabushiki Kaisha Toshiba, Minato-ku (JP)

(72) Inventors: Takayuki Fukasawa, Yokohama (JP); Kenji Essaki, Kawasaki (JP); Tomokazu Morita, Funabashi (JP); Takashi Kuboki, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 127 days.

(21) Appl. No.: 15/259,613

(22) Filed: Sep. 8, 2016

(65) Prior Publication Data

US 2017/0077498 A1 Mar. 16, 2017

(30) Foreign Application Priority Data

Sep. 11, 2015 (JP) ................................. 2015-179817

(51) Int. Cl.
| | | |
|---|---|---|
| *H01M 4/36* | (2006.01) | |
| *H01M 4/04* | (2006.01) | |
| *H01M 4/38* | (2006.01) | |
| *H01M 4/587* | (2010.01) | |
| *H01M 10/0525* | (2010.01) | |
| *H01M 4/13* | (2010.01) | |
| *H01M 4/66* | (2006.01) | |
| *H01M 4/62* | (2006.01) | |

(52) U.S. Cl.
CPC ......... *H01M 4/364* (2013.01); *H01M 4/0471* (2013.01); *H01M 4/13* (2013.01); *H01M 4/386* (2013.01); *H01M 4/587* (2013.01); *H01M 10/0525* (2013.01); *H01M 4/622* (2013.01); *H01M 4/661* (2013.01)

(58) Field of Classification Search
None
See application file for complete search history.

(56) References Cited

U.S. PATENT DOCUMENTS

| | | |
|---|---|---|
| 2004/0156724 A1 | 8/2004 | Torigoe et al. |
| 2007/0031733 A1 | 2/2007 | Kogetsu et al. |

(Continued)

FOREIGN PATENT DOCUMENTS

| | | |
|---|---|---|
| JP | 3631982 B2 | 3/2005 |
| JP | 2005-108522 A | 4/2005 |

(Continued)

OTHER PUBLICATIONS

Aso et al. (JP, 05195234) (a raw machine translation) (Abstract) (Aug. 3, 1993).*

*Primary Examiner* — Carmen V Lyles-Irving
(74) *Attorney, Agent, or Firm* — Oblon, McClelland, Maier & Neustadt, L.L.P.

(57) ABSTRACT

An electrode for a nonaqueous electrolyte battery of the embodiment includes a current collector; and an active material layer which includes an active material and is formed on the current collector. The active material layer includes at least one of a silicon particle and a silicon oxide particle. The active material layer has a plurality of cracks extending in a thickness direction of the active material layer.

10 Claims, 7 Drawing Sheets

(56) References Cited

U.S. PATENT DOCUMENTS

| | | | |
|---|---|---|---|
| 2009/0202915 A1* | 8/2009 | Modeki | H01M 4/134 429/246 |
| 2010/0151321 A1 | 6/2010 | Yamamoto et al. | |
| 2012/0308862 A1 | 12/2012 | Shibata et al. | |
| 2014/0147739 A1* | 5/2014 | Nakagawa | H01M 4/131 429/188 |

FOREIGN PATENT DOCUMENTS

| | | |
|---|---|---|
| JP | 2007-157704 A | 6/2007 |
| JP | 2007-207663 A | 8/2007 |
| JP | 2007-323901 | 12/2007 |
| JP | 2008-117785 A | 5/2008 |
| JP | 2010-218849 A | 9/2010 |
| JP | 2012-248477 A | 12/2012 |
| WO | WO 2011/071154 A1 | 6/2011 |
| WO | WO 2012/169282 A1 | 12/2012 |
| WO | WO 2013/145108 A1 | 10/2013 |
| WO | WO 2015/140907 A1 | 9/2015 |

* cited by examiner

ELECTRODE FOR NONAQUEOUS ELECTROLYTE BATTERY, NONAQUEOUS ELECTROLYTE BATTERY INCLUDING THE SAME, AND BATTERY PACK

CROSS-REFERENCE TO RELATED APPLICATION

This application is based upon and claims the benefit of priority from Japanese Patent Application No. 2015-179817, filed Sep. 11, 2015, the entire contents of which are incorporated herein by reference.

FIELD

Embodiments described herein relate generally to an electrode for a nonaqueous electrolyte battery, a nonaqueous electrolyte battery including the same, and a battery pack.

BACKGROUND

In recent years, a small portable terminal typified by a smartphone and a tablet, etc. is rapidly spread, which increases the demand for a battery having a small size and a high energy density for driving this terminal.

In general, a graphite material is used for a negative electrode of a lithium ion secondary battery. The theoretical capacity of a graphite material is 372 mAh/g ($LiC_6$), and at the present, the achieved capacity is approaching this limit. In order to further improve an energy density of a lithium ion secondary battery, it becomes necessary to select a new material. From this viewpoint, silicon and tin, which have the large specific capacity and the next lower potential than carbon and lithium, have attracted attention.

Of these materials, silicon can absorb 4.4 lithium atoms per 1 silicon atom in molar ratio, and theoretically, it is possible to obtain about 10 times the capacity of a graphite-based carbon material. However, when a silicon particle absorbs lithium, the volume thereof expands to about 3 to 4 times the original volume, and thus, there is the problem that repeated charge and discharge causes the deterioration, which results in the capacity reduction. This phenomenon was carefully analyzed, and the following was confirmed. When lithium is inserted into a silicon-containing active material, the volume expansion causes fine cracks in an electrode, and an electrolyte solution enters through these fine cracks, which forms a new coating film (SEI layer). In this process, an irreversible capacity is generated, which consequently reduces a battery capacity. This phenomenon appears as the change of a charge and discharge efficiency during cycles. The reduction of a cycle efficiency at an initial stage of cycles, at which volume change is particularly large, has a significant effect on the life of a battery including a positive electrode having a high charge and discharge efficiency. Therefore, when using a silicon-containing active material, it is the important issue to minimize the change of an electrode structure caused by the aforementioned volume expansion.

Examples of the method of dispersing and relieving the stress caused by volume expansion include the method of providing a large number of voids in an active material layer constituting an electrode. In the method of preparing a porous active material layer and connecting voids in a three-dimensional manner, it is possible to obtain a certain effect on the relief of volume expansion, but there are the problems of the decrease in electrode strength and the inability to increase a volume energy density. In addition, there is the proposed method of preliminarily patterning an active material layer so as to form grooves and to divide an electrode into small regions. However, in this method, the groove part does not include an active material, and thus, there is the problem of the decrease in the energy density per unit volume of an electrode.

DETAILED DESCRIPTION

Hereinafter, the electrode for a nonaqueous electrolyte battery of the embodiment and the nonaqueous electrolyte battery including this electrode are described with reference to the drawings.

An electrode for a nonaqueous electrolyte battery of the embodiment includes a current collector; and an active material layer which includes an active material and is formed on the current collector. The active material layer includes at least one of a silicon particle and a silicon oxide particle. The active material layer has a plurality of cracks extending in a thickness direction of the active material layer.

First Embodiment

The 1st embodiment provides the electrode for a nonaqueous electrolyte battery including a current collector; and an active material layer which includes an active material and is formed on the current collector (hereinafter, may be abbreviated as an "electrode").

Hereinafter, the electrode for a nonaqueous electrolyte battery according to the present embodiment is described in detail with reference to FIG. 1 to FIG. 3.

Figure 1:
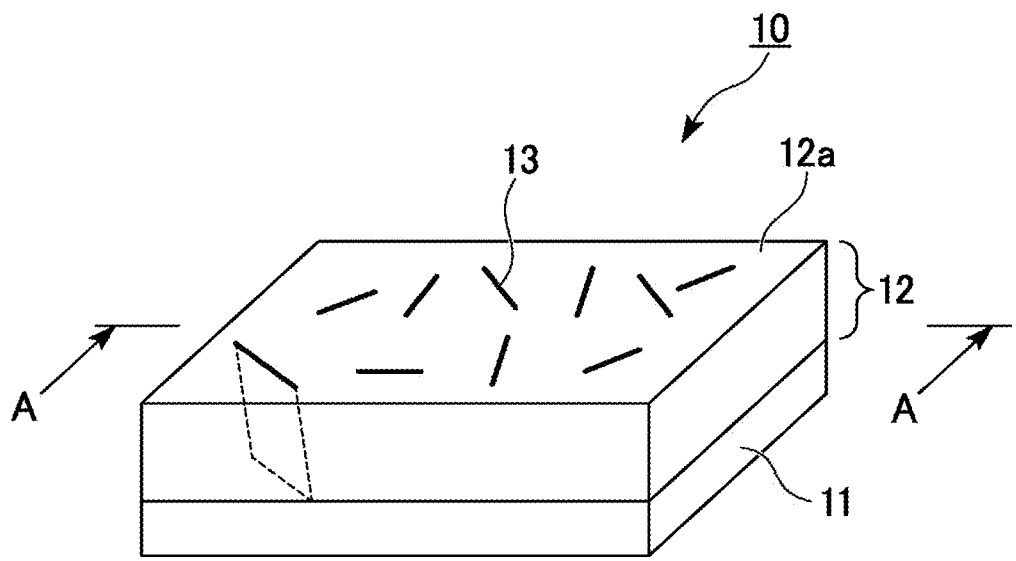
FIG. 1 is a perspective view illustrating a schematic configuration of the electrode for a nonaqueous electrolyte battery according to the 1 st embodiment.

FIG. 1 is a perspective view illustrating a schematic configuration of the electrode for a nonaqueous electrolyte battery according to the present embodiment. FIG. 2 is a schematic cross-sectional view along the A-A line of FIG. 1 which illustrates the electrode for a nonaqueous electrolyte battery according to the present embodiment. FIG. 3 is a schematic view illustrating a complex of a carbonaceous material and at least one of a silicon particle and a silicon oxide particle included in the electrode for a nonaqueous electrolyte battery according to the present embodiment.

The electrode 10 for a nonaqueous electrolyte battery according to the present embodiment includes the sheet-shaped current collector 11 and the active material layer 12 as shown in FIG. 1. This active material layer 12 is used for example as a negative electrode for the nonaqueous electrolyte battery described below.

The active material layer 12 is the layer which is provided on at least one surface 11a of the current collector 11 and includes an electroconductive agent, a binder and at least one of a silicon particle and a silicon oxide particle. In other words, the active material layer 12 is the layer in which the active material containing at least one of a silicon particle and a silicon oxide particle is supported on at least one surface 11a of the current collector 11.

A binder fills the gap between the active materials constituting the active material layer 12 so as to bind the active materials to each other or to bind the active material to an electroconductive agent, and to bond the current collector 11 to the active material layer 12. An electroconductive agent and a binder are optional components. Herein, the active material layer 12 can be formed even on the other surface 11b of the current collector 11.

The active material layer 12 has a plurality of cracks 13 extending in a thickness direction of the active material layer 12. In the present embodiment, the crack 13 is the face which includes a curved face and passes between the particles of the active material (a silicon particle and a silicon oxide particle) which mainly constitute the active material layer 12.

It is preferable that the surface orientations of the cracks 13 extending in the thickness direction of the active material layer 12 be random.

Also, it is preferable that the length of the crack 13 be no less than one-third of a thickness of the electrode 10. By setting the length of the crack 13 to no less than one-third of a thickness of the electrode 10, the cracks 13 can sufficiently exert the effect of stress relief of the active material layer 12.

The cracks 13 may be formed over the entire thickness of the active material layer 12. In other words, the crack 13 may be formed so as to pass through the active material layer 12 in the thickness direction.

The gap of the crack 13, i.e. the width of the crack 13 in the direction perpendicular to the thickness direction of the active material layer 12, is preferably 0.5 µm or more and 10 µm or less at a maximum one.

By setting the gap of the crack 13 within the aforementioned range, it is possible to sufficiently relieve the stress generated in the direction perpendicular to the thickness direction of the active material layer 12 and to prevent the reduction of the energy density per unit volume of the electrode 10 when the volume expansion of the silicon particle or the silicon oxide particle occurs during charge.

Figure 2:
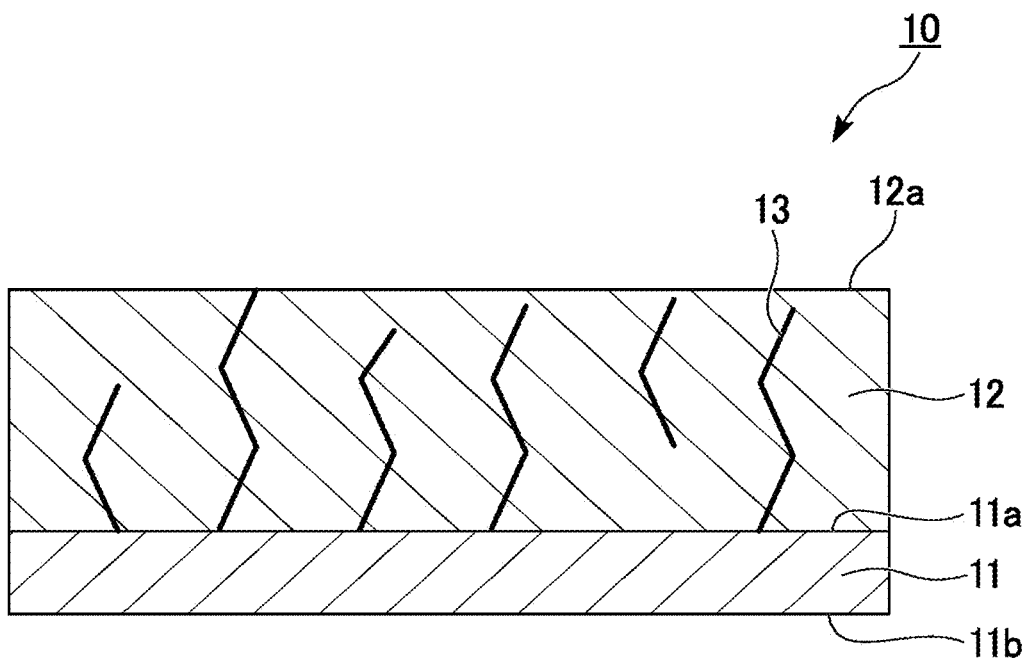
FIG. 2 is a schematic cross-sectional view along the A-A line of FIG. 1 which illustrates the electrode for a nonaqueous electrolyte battery according to the 1 st embodiment.

FIG. 2 is a schematic cross-sectional view along the A-A line of FIG. 1, and more specifically, a schematic view showing the cross-section (hereinafter, referred to as the "cross-section α") which passes by a center of an opposite surface 12a to a surface of the active material layer 12 contacting the current collector 11 and is along the thickness direction of the active material layer 12.

In the present embodiment, it is preferable that at least 2 pieces of the cracks 13 exist per 100 µm width of the active material layer 12 in the cross-section α (the length in the direction perpendicular to the thickness direction of the active material layer 12 in the cross-section α).

When the particle (complex) obtained by complexing the silicon-based material (the silicon particle and the silicon oxide particle) and the carbonaceous material is used as the active material, the preferable particle diameter (secondary particle diameter) is about 30 µm at a maximum. For this reason, it is preferable that the number of the crack 13 formed at the interface of the particles (complexes) be within the aforementioned range. Also, it is preferable that the cracks 13 do not be unevenly distributed in a partial region of the active material layer 12 but be evenly distributed in the entire region of the active material layer 12. When the cracks are evenly distributed in the entire region, it is possible to relieve the stress generated in the active material layer 12 in the entire region of the active material layer 12.

It is possible to confirm the shape and the number of the crack 13 by using a scanning electron microscopy (SEM) for a plurality of cross-sectional surfaces of the active material layer 12 or by using the 3-dimensional image analysis of the active material layer 12 through X-ray CT scanner.

By providing the cracks 13 in the active material layer 12, it is possible to obtain the advantageous effects in that an electrolytic solution easily permeate the active material layer through the gap and that the charge and discharge of the battery is easily carried out.

The thickness of the active material layer 12 is preferably 10 µm or more and 150 µm or less, and more preferably 10 µm or more 100 µm or less. For this reason, when the active material layers 12 are formed on both of one surface 11a and the other surface 11b of the current collector 11, the total thickness of the active material layer 12 becomes 20 µm or more and 300 µm or less. By setting the thickness of the active material layer 12 to 10 µm or more and 150 µm or less, the large-current discharge property and the cycle life are significantly improved.

The active material contained in the active material layer 12 is at least one of the silicon particle and the silicon oxide particle, or the complex containing a carbonaceous material and at least one of the silicon particle and the silicon oxide particle.

The silicon oxide in the present embodiment is represented by $SiO_x$ ($0<x\leq2$). In the present embodiment, the complex containing a carbonaceous material and at least one of the silicon particle and the silicon oxide particle is preferable as the active material.

Figure 3:
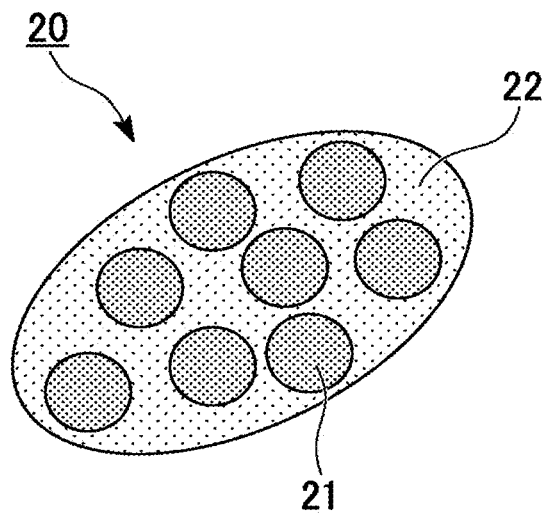
FIG. 3 is a schematic view illustrating a complex of a carbonaceous material and at least one of a silicon particle and a silicon oxide particle included in the electrode for a nonaqueous electrolyte battery according to the 1st embodiment.

As shown in FIG. 3, the complex 20 contains the carbonaceous material 22 and the silicon-based particle (at least one of the silicon particle and the silicon oxide particle) 21. More specifically, as shown in FIG. 3, the complex 20 has the structure in which a plurality of the silicon-based particles 21 is coated with the carbonaceous material 22. Herein, the complex 20 can have the structure in which 1 piece of the silicon-based particle 21 is coated with carbonaceous material 22.

Also, a part of the silicon-based particles 21 can be exposed to the outside of the complex 20.

The silicon-based particle 21 can contain trace elements such as phosphorus or boron. Also, the silicon-based particle 21 can be an amorphous particle, a highly crystalline particle, or a mixture thereof. By preparing this kind of structure, it is possible to prevent the silicon-based particle 21 is peeled off and fall off from the complex 20.

It is preferable that the silicon-based particle 21 be as fine as possible because a volume change occurs with each repetition of the insertion and extraction of lithium.

When a silicon particle is used as the silicon-based particle 21, the primary particle diameter of a silicon particle is preferably 10 nm or more and 150 nm or less. When the primary particle diameter of a silicon particle is less than 10 nm, it is substantially difficult to safely produce a silicon particle. On the other hand, when the primary particle diameter of a silicon particle is more than 150 nm, a silicon particle itself is easily pulverized with the repetition of charge and discharge, which causes the unfavorable result.

When a silicon oxide particle is used as the silicon-based particle 21, it is preferable that the primary particle diameter of a silicon oxide particle be 20 nm or more and 10 μm or less, and more preferably 20 nm or more and 1 μm or less. When the primary particle diameter of a silicon oxide particle is within the aforementioned range, the disproportionation reaction is caused by subjecting a silicon oxide particle to a heat treatment. The nano-sized silicon particles are precipitated through this disproportionation. The silicon particle is complexed with the silicon oxide acting as a carrier, which forms the complex having a small particle diameter, i.e. the complex of the silicon oxide and the silicon particle.

In the present embodiment, the particle diameters of the silicon particle and the silicon oxide particle are defined as those measured by the following measurement method.

In order to observe the microstructure in the active material layer, a part of the active material layer is sliced, and the part to be observed is further sliced by using an ion milling apparatus, etc. The inside of the complex constituting the active material layer is observed by transmission electron microscopy (TEM) at a magnification of 200,000 times or more (about 20,000 times or more in the case of a silicon oxide). Then, at least 10 particles existing on the diagonal line of a field of view are selected, and the major axis and the minor axis thereof are measured, and the average value obtained by averaging the major axis and the minor axis is defined as the particle diameters of the silicon particle and the silicon oxide particle.

It is preferable that the carbonaceous material 22 be an amorphous carbon phase. The material of the carbonaceous material 22 is described below.

The carbonaceous material 22 can contain a conductive agent. Usable examples of the conductive agent include carbon materials such as highly crystalline graphite, a carbon nanofiber and a carbon nanotube; and fine particles such as acetylene black.

Also, the carbonaceous material 22 can have fine pores having a size of 10 nm or more and 1 μm or less.

The active material layer 12 can contains the binder.

The binder fills the gap between the active materials so as to bind the active materials to each other or to bind the active material to the electroconductive agent, and to bond the current collector 11 to the active material layer 12 comprised of the active material and the electroconductive agent.

Examples of the binder to be used include at least one selected from the group consisting of a polyamic acid, a polyamide-imide, a polyimide, a polyaramide, a polyacrylic acid, a polyvinylidene fluoride (PVdF), a styrene-butadiene rubber (SBR) and a carboxymethyl cellulose. The binder can be used alone or in combination of two or more.

The life property of the electrode 10 can be improved by employing the combination of the binder having excellent binding property for the active materials and the binder having excellent binding property for the active material and the current collector 11, or the combination of the binder having high hardness and the binder having excellent flexibility.

In the present embodiment, the interfacial bonding strength between the current collector 11 and the active material layer 12 is important. As the binder, polyamide-imide and polyimide are more preferable because it is possible to bond these with higher strength.

The current collector 11 is the electroconductive member that binds the active material layer 12. As the current collector 11, it is possible to use an electroconductive substrate having a porous structure or a non-porous electroconductive substrate. These electroconductive substrates can be formed of an electroconductive material such as copper, nickel, alloys thereof or stainless steel. Of these electroconductive materials, copper (including a copper alloy) or stainless steel is the most preferable in terms of electroconductivity.

Also, it is preferable that the thickness of the current collector 11 be 5 μm or more and 20 μm or less. When the thickness of the current collector 11 is within the above range, it is possible to keep the good balance between electrode strength and weight reduction Next, the production method of the electrode 10 is described.

(Complexing Treatment)

The silicon-based particle is mixed with an organic material, and this mixture is carbonized and heat-treated, to thereby complexing the silicon-based particle and an organic material, and prepare the composite containing the silicon-based particle and an organic material. In this treatment, the aforementioned conductive agent can be added in the mixture.

Usable examples of an organic material include at least one selected from the group consisting of carbon materials and carbon precursors such as graphite, coke, low-temperature fired coal and pitch. The materials such as pitch, which are melted by heating, are melted during the mechanical milling process, and the complexing treatment is difficult to proceed well. For this reason, it is preferable to use the materials such as graphite and coke which are not melted.

Hereinafter is the description for the method of complexing the silicon-based particle and the organic material by using a mixing and stirring treatment in a liquid phase. For a mixing and stirring treatment, for example, various types of stirring devices, a ball mill device and a bead mill device, etc. are used. A mixing and stirring treatment can be carried out by 1 device of these devices or by 2 or more devices in combination.

It is preferable that the complexing of the silicon-based particle, the organic material and the conductive agent be carried out by a liquid-phase mixing treatment in a dispersion medium in order to disperse these materials more uniformly.

Usable examples of a dispersion medium include an organic solvent and water, etc., and it is preferable to use the liquid having excellent affinity with the silicon-based particle and the organic material. Examples of this kind of dispersion medium include ethanol, acetone, isopropyl alcohol, methyl ethyl ketone, ethyl acetate and N-methylpyrrolidone (NMP).

In order to uniformly mix the carbon precursor and the silicon-based particle, it is preferable that the carbon precursor be soluble in a liquid or a dispersion medium in a mixing step, and it is more preferable that the carbon precursor be a readily polymerizable monomer or oligomer. Examples of the carbon precursor include organic materials such as a furan resin, a xylene resin, a ketone resin, an amino resin, a melamine resin, an urea resin, an aniline resin, an urethane resin, a polyimide resin, a polyester resin, a phenolic resin, a resole resin, a polyvinyl alcohol and sucrose.

The aforementioned materials are mixed in a liquid phase, and the mixture is solidified or dried, to thereby produce the complexed material of the silicon-based particle and the organic material. Thereafter, the complexed material is carbonized and fired, to thereby form the complex of the silicon-based particle and the carbonaceous material.
(Carbonization and Firing Treatment)

The carbonization and firing of the aforementioned complexed material is carried out, for example, under an inert atmosphere such as argon (Ar). The atmosphere during the carbonization and firing of the complexed material is not limited to an inert atmosphere, and can be a mixed atmosphere such as argon containing hydrogen.

The temperature for the aforementioned carbonization and firing of the complexed material is suitably adjusted depending on the thermal decomposition temperature of the organic material contained in the complexed material, and is preferably 700° C. or higher and 1200° C. or lower.

When the temperature for the carbonization and firing is higher than 1200° C., the silicon carbide reaction of the silicon-based particle and the organic material proceeds more than necessary, and the charge and discharge capacity significantly decreases, which causes the unfavorable result.

The firing time is preferably 10 minutes or more and 12 hours or less.

The active material of the present embodiment can be obtained by the aforementioned synthesis method.

The product (active material) of the carbonization and firing can be subjected to devices such as various kinds of mill, pulverizing devices and grinders, to thereby adjust the particle size and the specific surface area, etc. thereof within the predetermined ranges.

By using the aforementioned active material, it is possible to increase the initial discharge capacity and the initial charge and discharge efficiency, and to achieve nonaqueous electrolyte secondary battery excellent in an energy density.
(Formation of Active Material)

The aforementioned electrode 10 is produced by using the active material produced in the aforementioned method.

Firstly, the active material and the binder are suspended in a general solvent so as to prepare a slurry. Herein, the electroconductive agent is added thereto as necessary so as to prepare a slurry.

Subsequently, the slurry is applied onto at least one surface 11a of the current collector 11 followed by drying to form the coating film containing the active material.

Then, the coating film formed on the current collector 11 is subjected to pressing, to thereby obtain the active material layer 12.

Also, the mixture containing the active material, the conductive agent and the binder is molded into a pellet shape, and this pellet-shaped mixture is placed on at least one surface 11a of the current collector 11, to thereby form the active material layer 12.
(Formation of Cracks)

The cracks 13 are formed in the active material layer 12 formed on the current collector 11 along the thickness direction thereof.

The current collector 11 coated with the active material layer 12 is folded by the rod-shaped roller having a small curvature radius such that the active material layer 12 is placed on the outside, and the tensile force is applied in the width direction of the active material layer 12 (the direction perpendicular to the thickness direction of the active material layer 12), to thereby form the cracks 13 along the thickness direction of the active material layer 12.

The radius of the roller is preferably 2 mm or more and 10 mm or less which is the range capable of forming the cracks 13 without leaving a deformation to the current collector 11.

When the active material layer 12 having the cracks 13 is formed on both of one surface 11a and the other surface 11b of the current collector 11, the aforementioned slurry is applied on one surface 11a of the current collector 11, and this slurry is dried to thereby form the active material layer 12. Then, the cracks 13 are formed in the active material layer 12. Thereafter, the aforementioned slurry is applied on the other surface 11b of the current collector 11, and this slurry is dried to thereby form the active material layer 12. Then, the cracks 13 are formed in the active material layer 12.

Alternatively, the aforementioned slurry is applied on both of one surface 11a and the other surface 11b of the current collector 11, and this slurry is dried to thereby form the active material layers 12 on both of one surface 11a and the other surface 11b of the current collector 11. Thereafter, the cracks 13 are formed on one surface 11a of the current collector 11, and then, the cracks 13 are formed on the other surface 11b of the current collector 11.

In the present embodiment, it is not preferable that the cracks be generated in the width direction of the active material layer 12 (the direction perpendicular to the thickness direction of the active material layer 12) because the electrical connection between the active material layer and the current collector 11 is insulated and it is not possible to obtain the effect of relieving the stress generated in the direction perpendicular to the thickness direction of the active material layer 12. For this reason, in the present embodiment, it is preferable to prevent the cracks from being generated in the width direction of the active material layer 12.

Also, it is preferable to prevent the cracks 13 from being formed to the inside of the active material constituting the active material layer 12. In order to prevent the cracks 13 from being formed to the inside of the active material, it is preferable to use the complex comprising the aforementioned silicon-based particle and the carbonaceous material as the active material.

When analyzing the deterioration behavior during the charge and discharge cycles of the active material layer containing the silicon-based particle-containing active material, it is confirmed that, in the initial stage of the charge and discharge cycles, a large volume expansion is generated in the thickness direction of the active material layer, and the macroscopic vertical cracks (i.e. cracks) are generated in the thickness direction of the active material layer.

However, in the electrode 10 for a nonaqueous electrolyte battery according to the present embodiment, the binding property of the active material layer 12 to the current collector 11 is maintained although the crack 13 divides a part of the active material layer 12 on the plane perpendicular to the thickness direction of the active material layer 12. For this reason, the charge and discharge capacity is not reduced by the crack 13 unless a collapse or a crack is generated in the active material or the active material cracks in the direction perpendicular to the thickness direction of the active material layer 12. Also, the gap of the crack 13 is very fine, and thus, the energy density per unit volume of the electrode 10 is not reduced.

In the electrode 10 for a nonaqueous electrolyte battery according to the present embodiment, a plurality of the cracks 13 extending in the thickness direction of the active material layer 12 is formed, and therefore, it is possible to relieve the stress generated by the volume expansion of the active material layer 12, and also, it is possible to suppress the capacity reduction caused by forming the new coating film made from the nonaqueous electrolyte solution on the surface of the active material. Also, in the electrode 10 for a nonaqueous electrolyte battery according to the present embodiment, a plurality of the cracks 13 extending in the thickness direction of the active material layer 12 is formed, and therefore, it is possible to relieve the volume expansion in the thickness direction of the active material layer 12 during charge. Also, in the electrode 10 for a nonaqueous electrolyte battery according to the present embodiment, the fine gaps of the cracks 13 are formed in the active material layer 12, and therefore, the expansion even in the direction perpendicular to the thickness direction of the active material layer 12 is relieved, and also, the energy density per unit volume of the electrode 10 is not reduced. For these reasons, the cycle characteristics are improved in the nonaqueous electrolyte battery including the electrode 10 for a nonaqueous electrolyte battery according to the present embodiment.

Second Embodiment

The 2nd embodiment provides the nonaqueous electrolyte battery including the negative electrode comprised of the electrode according to the aforementioned 1st embodiment, a positive electrode, a nonaqueous electrolyte, a separator and an exterior material.

More specifically, the nonaqueous electrolyte battery according to the present embodiment includes an exterior material, a positive electrode that is housed in the external material, the negative electrode that is spatially separated from the positive electrode and is housed in the external material with a separator interposed therebetween, and a nonaqueous electrolyte charged in the external material.

Hereinafter, the negative electrode, the positive electrode, the nonaqueous electrolyte, the separator and the exterior material, which are constituent members of the nonaqueous electrolyte battery according to the present embodiment, are described in detail.

(1) Negative Electrode

As the negative electrode, the aforementioned electrode according to the 1 st embodiment is used.

(2) Positive Electrode

The positive electrode includes the positive electrode current collector and the positive electrode mixture layer which is formed on one surface or both surfaces of the positive electrode current collector and includes a positive electrode active material, an electroconductive agent and a binder. An electroconductive agent and a binder are optional components.

Examples of the positive electrode active material include a lithium-manganese composite oxide (such as $Li_xMn_2O_4$ or $Li_xMnO_2$), a lithium-nickel composite oxide (such as $Li_x$-$NiO_2$), a lithium-cobalt composite oxide (such as $Li_xCoO_2$), a lithium-nickel-cobalt composite oxide (such as $LiNi_{1-x}Co_xO_2$, $0<x\le1$), a lithium-manganese-cobalt composite oxide (such as $LiMn_{2-x}Co_xO_4$, $0<x\le1$), a lithium-copper composite oxide (such as $Li_2Cu_xNi_{1-x}O_4$, $0\le x\le1$), and a lithium iron phosphate (such as $LiMn_xFe_{1-x}PO_4$, $0\le x\le1$). As the positive electrode active material, these compounds can be used alone or in combination of two or more.

The electroconductive agent improves the current collection performance of the positive electrode active material and suppresses contact resistance between the positive electrode active material and the positive current collector. Examples of the electroconductive agent include agents containing acetylene black, carbon black, artificial graphite, natural graphite, a carbon fiber, and an electroconductive polymer.

As the electroconductive agent, these types can be used alone or in combination of two or more.

The binder fills the gap between the dispersed positive electrode active materials so as to bind the positive electrode active material to the electroconductive agent and to bind the positive electrode active material to the positive electrode current collector.

Examples of the binder include polytetrafluoroethylene (PTFE), polyvinylidene fluoride (PVdF), fluorine-based rubber, styrene-butadiene rubber (SBR), polypropylene (PP), polyethylene (PE), carboxymethyl cellulose (CMC), polyimide (PI), and polyacrylimide (PAI).

As the binder, these types can be used alone or in combination of two or more.

Also, examples of an organic solvent for dispersing the binder include N-methyl-2-pyrrolidone (NMP) and dimethylformamide (DMF).

Regarding the blending ratio of the positive electrode active material, the electroconductive agent and the binder in the positive electrode mixture layer, the positive electrode active material is preferably blended within a range of 80 mass % or more and 95 mass % or less, the electroconductive agent is preferably blended within a range of 3 mass % or more and 20 mass % or less, and the binder is preferably blended within a range of 2 mass % or more and 7 mass % or less.

The positive electrode current collector is the electroconductive member to be bound with the positive electrode mixture layer. As the positive electrode current collector, an electroconductive substrate having a porous structure or a non-porous electroconductive substrate can be used.

Next, the production method of the positive electrode is described.

Firstly, the positive electrode active material, the electroconductive agent and the binder are suspended in a general solvent so as to prepare slurry.

Subsequently, the slurry is applied on the positive electrode current collector followed by drying to form the positive electrode mixture layer. Then, the positive electrode mixture layer is subjected to pressing, to thereby obtain the positive electrode.

Also, the positive electrode can be produced by molding the positive electrode active material, the binder and the electroconductive agent to be blended according to need in a pellet shape to form the positive electrode mixture layer, and disposing this positive electrode mixture layer on the positive electrode current collector.

(3) Nonaqueous Electrolyte

As the nonaqueous electrolyte, a nonaqueous electrolyte solution, an electrolyte-impregnated polymer electrolyte, a polymer electrolyte or an inorganic solid electrolyte are used.

A nonaqueous electrolyte solution is a liquid nonaqueous electrolyte prepared by dissolving an electrolyte in a nonaqueous solvent (an organic solvent), and is held in the gap in the electrode group.

As a nonaqueous solvent, it is preferable to use the solvent which mainly contains the mixed solvent of cyclic carbonates (hereinafter, referred to as the "1 st solvent") such as ethylene carbonate (EC), propylene carbonate (PC) and vinylene carbonate, and nonaqueous solvents having lower viscosity than the cyclic carbonates (hereinafter, referred to as the "2nd solvent").

Examples of the 2nd solvent include chain carbonates such as dimethyl carbonate (DMC), diethyl carbonate (DEC) and methylethyl carbonate (MEC); cyclic ethers such as tetrahydrofuran and 2-methyltetrahydrofuran; chain ethers such as dimethoxyethane and diethoxyethane; ethyl propionate; methyl propionate; γ-butyrolactone (GBL); acetonitrile (AN); ethyl acetate (EA); toluene; xylene; and methyl acetate (MA).

Examples of an electrolyte contained in a nonaqueous electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethanesulfonate ($LiCF_3SO_3$). Among these, it is preferable to use lithium hexafluorophosphate or lithium tetrafluoroborate.

It is preferable that the dissolving amount of the electrolyte relative to the nonaqueous solvent contained in nonaqueous electrolyte be 0.5 mol/L or more and 2.0 mol/L or less.

(4) Separator

The separator is placed between the positive electrode and the negative electrode in order to prevent the positive electrode and the negative electrode from having contact with each other. The separator is comprised of an insulating material.

The shape, by which an electrolyte can move between the positive electrode and the negative electrode, is used for the separator. The separator is formed of a porous film such as polyethylene (PE), polypropylene (PP), cellulose or polyvinylidene fluoride (PVdF), or a nonwoven fabric made of a synthetic resin, for example.

(5) Exterior Material

As the exterior material which houses the positive electrode, the negative electrode and the nonaqueous electrolyte, a metal container or an exterior container made of a laminated film is used.

As a metal container, the metal can, which is formed of aluminum, an aluminum alloy, iron or stainless steel in a rectangular or cylindrical shape, is used.

As an aluminum alloy, an alloy containing an element such as magnesium, zinc or silicon is preferred. When a transition metal such as iron, copper, nickel or chromium is contained in the aluminum alloy, the content of the transition metal is preferably 100 ppm or less. Because the metal container made of the aluminum alloy has the much greater strength than the metal container made of aluminum, the thickness of the metal container can be reduced. As a result, it is possible to realize the thin and lightweight nonaqueous electrolyte battery which has high power and excellent heat radiation property.

Examples of a laminated film include a multi-layer film in which an aluminum foil is coated with a resin film. Usable examples of a resin constituting a resin film include a polymer compound such as polypropylene (PP), polyethylene (PE), nylon or polyethylene terephthalate (PET).

Herein, the present embodiment can be applied to the nonaqueous electrolyte battery having various shapes such as a flat type (thin type), a square type, a cylindrical type, a coin type and a button type.

Also, the nonaqueous electrolyte battery according to the present embodiment can further include a lead which is electrically connected to the electrode group containing the positive electrode and the negative electrode. For example, the nonaqueous electrolyte battery according to the present embodiment can include two leads. In this case, one of the leads is electrically connected to the positive electrode current collector tab and the other lead is electrically connected to the negative electrode current collector tab.

The material of the lead is not particularly limited, but for example, the same material for the positive electrode current collector and the negative electrode current collector is used.

The nonaqueous electrolyte battery according to the present embodiment can further include a terminal which is electrically connected to the aforementioned lead and is drawn from the aforementioned exterior material. For example, the nonaqueous electrolyte battery according to the present embodiment can include two terminals. In this case, one of the terminals is connected to the lead which is electrically connected to the positive electrode current collector tab and the other terminal is connected to the lead which is electrically connected to the negative electrode current collector tab.

The material of the terminal is not particularly limited, but for example, the same material for the positive electrode current collector and the negative electrode current collector is used.

(6) Nonaqueous Electrolyte Battery

Figure 4:
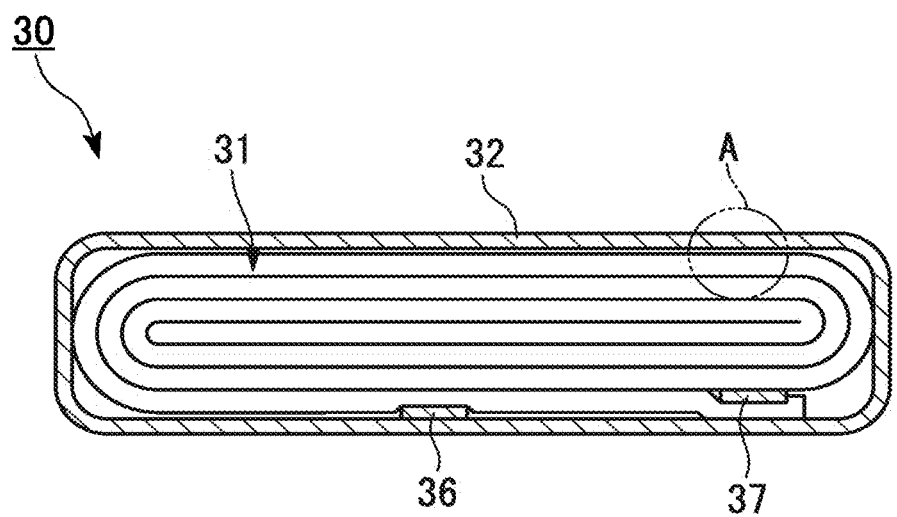
FIG. 4 is a schematic view illustrating the nonaqueous electrolyte battery according to the 2nd embodiment.
Figure 5:
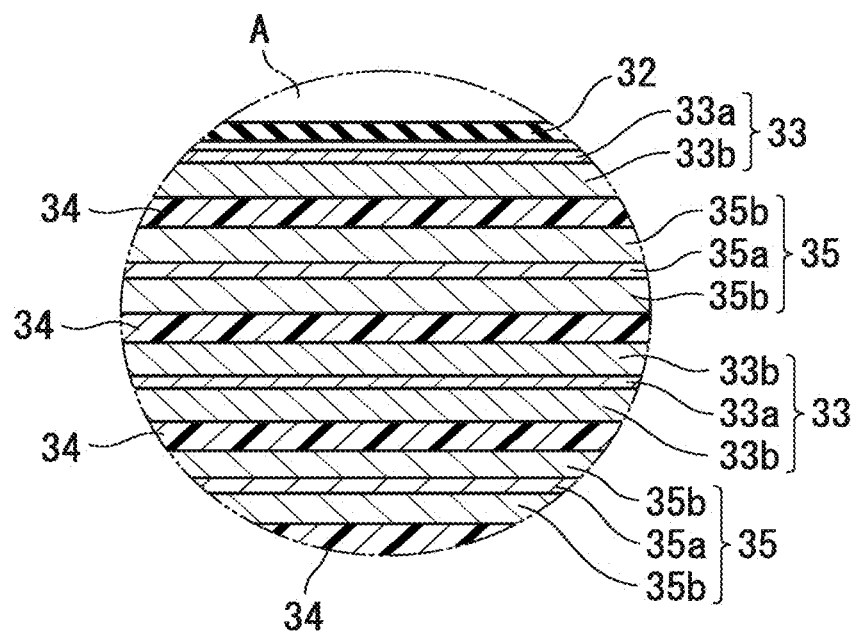
FIG. 5 is a schematic view illustrating the nonaqueous electrolyte battery according to the 2nd embodiment.

Next, the flat type nonaqueous electrolyte battery (nonaqueous electrolyte battery) 30 illustrated in FIG. 4 and FIG. 5 is described as an example of the nonaqueous electrolyte battery according to the present embodiment. FIG. 4 is a schematic sectional view illustrating the cross-section of the flat type nonaqueous electrolyte battery 30. Also, FIG. 5 is an enlarged sectional view illustrating the part A illustrated in FIG. 4. These drawings are schematic diagrams for describing the nonaqueous electrolyte battery according to the embodiment. The shapes, dimensions, ratios, and the like are different from those of actual device at some parts, but design of the shape, dimensions, ratios, and the like can be appropriately modified in consideration of the following description and known technologies.

The flat type nonaqueous electrolyte battery 30 illustrated in FIG. 4 is configured such that the winding electrode group 31 with a flat shape is housed in the exterior material 32. The exterior material 32 may be a container obtained by forming a laminated film in a bag-like shape or may be a metal container. Also, the winding electrode group 31 with the flat shape is formed by spirally winding the laminated product obtained by laminating the negative electrode 33, the separator 34, the positive electrode 35 and the separator 34 from the outside, i.e. the side of the exterior material 32, in this order, followed by performing press-molding. As illustrated in FIG. 5, the negative electrode 33 located at the outermost periphery has the configuration in which the negative electrode layer 33b is formed on one surface of the negative electrode current collector 33a on the inner surface side. The negative electrodes 33 at the parts other than the outermost periphery have the configuration in which the negative electrode layers 33b are formed on both surfaces of the negative current collector 33a. Also, the positive electrode 35 has the configuration in which the positive electrode layers 35b are formed on both surfaces of the positive current collector 35a. Herein, a gel-like nonaqueous electrolyte can be used instead of the separator 34.

In the vicinity of the outer peripheral end of the winding electrode group 31 illustrated in FIG. 4, the negative electrode terminal 36 is electrically connected to the negative current collector 33a of the negative electrode 33 of the outermost periphery. The positive electrode terminal 37 is electrically connected to the positive current collector 35a of the inner positive electrode 35. The negative electrode terminal 36 and the positive electrode terminal 37 extend toward the outer portion of the exterior material 32, and are connected to the extraction electrodes included in the exterior material 32.

When manufacturing the nonaqueous electrolyte battery 30 including the exterior material formed of the laminated film, the winding electrode group 31 to which the negative electrode terminal 36 and the positive electrode terminal 37 are connected is charged in the exterior material 32 having the bag-like shape with an opening, the liquid nonaqueous electrolyte is injected from the opening of the exterior material 32, and the opening of the exterior material 32 with the bag-like shape is subjected to heat-sealing in the state of sandwiching the negative electrode terminal 36 and the positive electrode terminal 37 therebetween. Through this process, the winding electrode group 31 and the liquid nonaqueous electrolyte are completely sealed.

Also, when manufacturing the nonaqueous electrolyte battery 30 having the exterior material formed of the metal container, the winding electrode group 31 to which the negative electrode terminal 36 and the positive electrode terminal 37 are connected is charged in the metal container having an opening, the liquid nonaqueous electrolyte is injected from the opening of the exterior material 32, and the opening is sealed by mounting a cover member on the metal container.

For the negative electrode terminal 36, it is possible to use the material having electric stability and electroconductivity within a range of a potential equal to or more than 0 V and equal to or lower than 3 V with respect to lithium, for example. Specific examples of this material include aluminum and an aluminum alloy containing an element such as Mg, Ti, Zn, Mn, Fe, Cu or Si. Also, it is more preferable that the negative electrode terminal 36 be formed of the same material as the negative current collector 33a in order to reduce the contact resistance with the negative current collector 33a.

For the positive electrode terminal 37, it is possible to use the material having electric stability and electroconductivity within a range of a potential equal to or more than 2 V and equal to or lower than 4.25 V with respect to lithium. Specific examples of this material include aluminum and an aluminum alloy containing an element such as Mg, Ti, Zn, Mn, Fe, Cu or Si. It is more preferable that the positive electrode terminal 37 be formed of the same material as the positive current collector 35a in order to reduce the contact resistance with the positive current collector 35a.

Hereinafter, the exterior material 32, the negative electrode 33, the positive electrode 35, the separator 34, and the nonaqueous electrolyte which are constituent members of the nonaqueous electrolyte battery 30 is described in detail.
(1) Exterior Material As the exterior material 32, the aforementioned exterior material is used.
(2) Negative Electrode As the negative electrode 33, the aforementioned electrode according to the 1st embodiment is used.
(3) Positive Electrode As the positive electrode 35, the aforementioned positive electrode is used.
(4) Separator As the separator 34, the aforementioned separator is used.
(5) Nonaqueous Electrolyte As the nonaqueous electrolyte, the aforementioned nonaqueous electrolyte is used.

Figure 6:
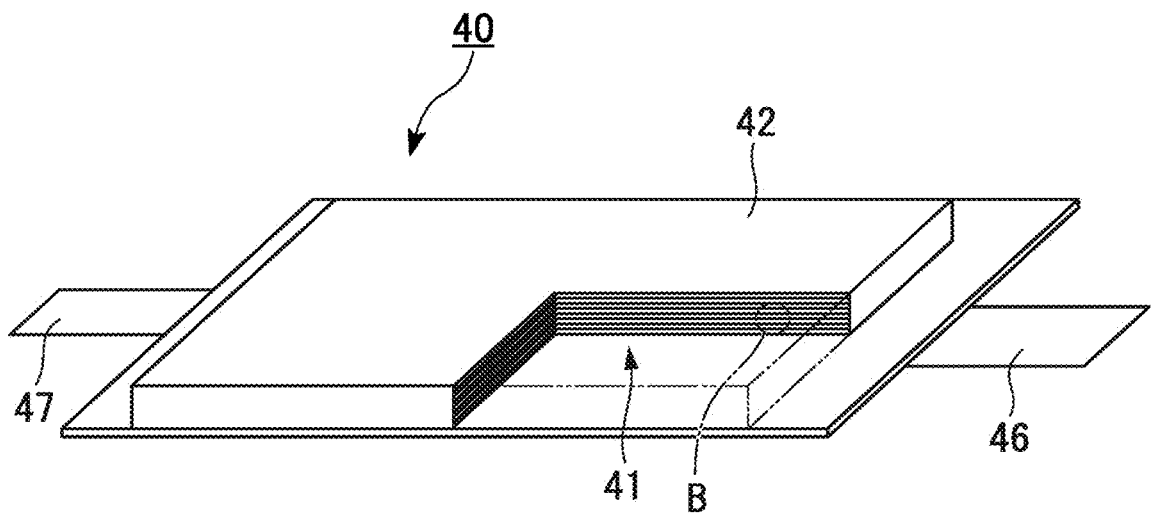
FIG. 6 is a schematic view illustrating the nonaqueous electrolyte battery according to the 2nd embodiment.
Figure 7:
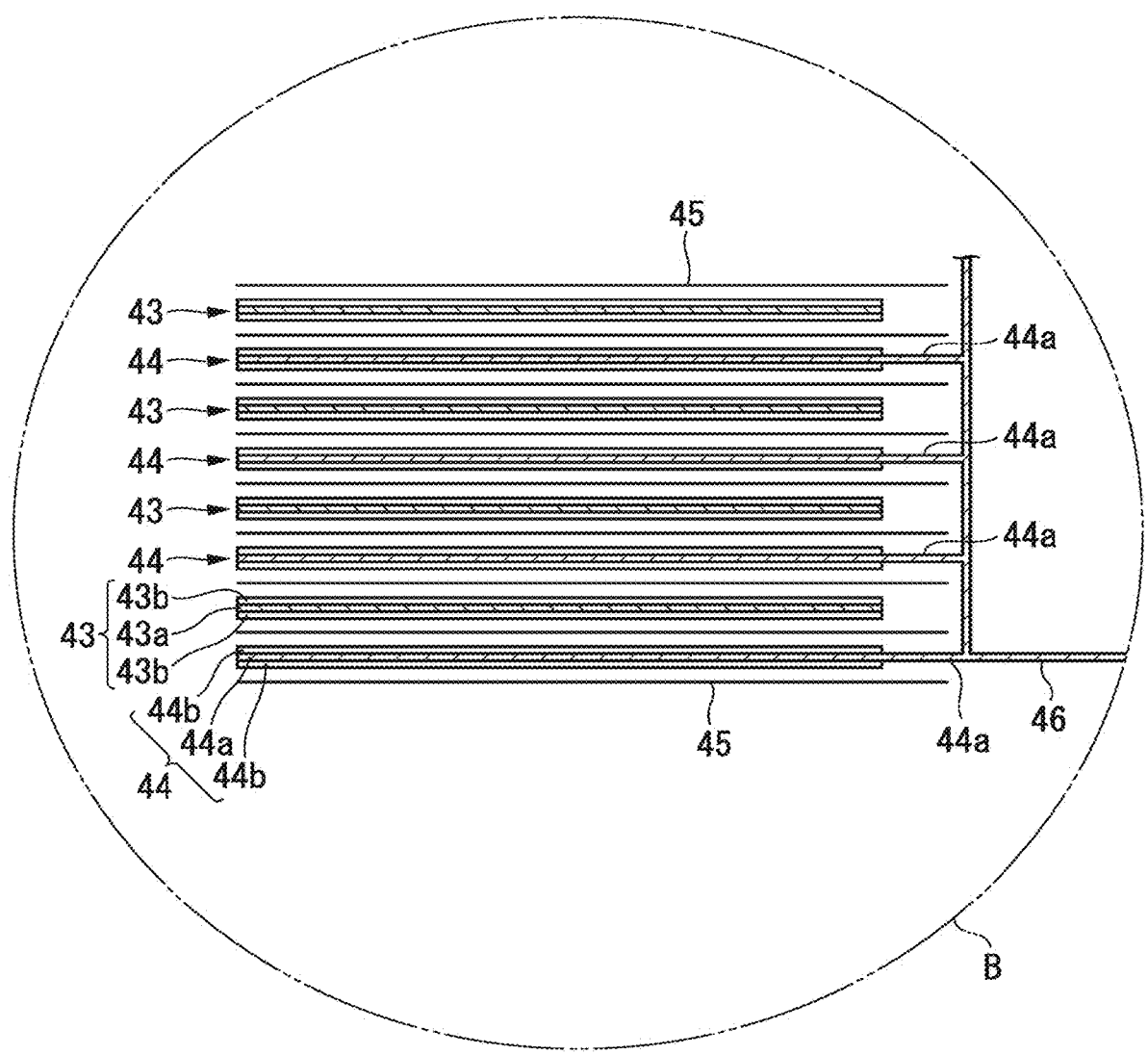
FIG. 7 is a schematic view illustrating the nonaqueous electrolyte battery according to the 2nd embodiment.

The configuration of the nonaqueous electrolyte battery according to the 2nd embodiment is not limited to the aforementioned configuration illustrated in FIG. 4 and FIG. 5. For example, the batteries having the configurations illustrated in FIG. 6 and FIG. 7 can be used. FIG. 6 is a partial cutout perspective view schematically illustrating another flat type nonaqueous electrolyte battery according to the 2nd embodiment. FIG. 7 is an enlarged schematic sectional view illustrating the part B of FIG. 6.

The nonaqueous electrolyte battery 40 illustrated in FIG. 6 and FIG. 7 is configured such that the lamination type electrode group 41 is housed in the exterior member 42. As illustrated in FIG. 7, the lamination type electrode group 41 has the structure in which the positive electrodes 43 and negative electrodes 44 are alternately laminated while interposing separators 45 therebetween.

The plurality of positive electrodes 43 are present and each includes the positive electrode current collector 43a and the positive electrode layers 43b supported on both surfaces of the positive electrode current collector 43a. The positive electrode layer 43b contains the positive electrode active material.

The plurality of negative electrodes 44 are present and each includes the negative electrode current collector 44a and the negative electrode layers 44b supported on both surfaces of the negative electrode current collector 44a. The negative electrode layer 44b contains the negative electrode material. One side of the negative electrode current collector 44a of each negative electrode 44 protrudes from the negative electrode 44. The protruding negative electrode current collector 44a is electrically connected to a strip-shaped negative electrode terminal 46. The front end of the strip-shaped negative electrode terminal 46 is drawn from the exterior member 42 to the outside. Although not illustrated, in the positive electrode current collector 43a of the positive electrode 43, the side located opposite to the protruding side of the negative electrode current collector 44a protrudes from the positive electrode 43. The positive electrode current collector 43a protruding from the positive electrode 43 is electrically connected to the strip-shaped positive electrode terminal 47. The front end of the strip-shaped positive electrode terminal 47 is located on an opposite side to the negative electrode terminal 46, and is drawn from the side of the exterior member 42 to the outside.

The material, a mixture ratio, dimensions, and the like of each member included in the nonaqueous electrolyte battery 40 illustrated in FIG. 6 and FIG. 7 are configured to be the same as those of each constituent member of the nonaqueous electrolyte battery 30 described in FIG. 4 and FIG. 5.

According to the present embodiment described above, it is possible to provide the nonaqueous electrolyte battery.

The nonaqueous electrolyte battery (nonaqueous electrolyte secondary battery) according to the present embodiment includes the negative electrode, the positive electrode, the nonaqueous electrolyte, the separator and the exterior material. The negative electrode is comprised of the aforementioned electrode for a nonaqueous electrolyte battery according to the 1st embodiment. The active material layer constituting the electrode for a nonaqueous electrolyte battery includes at least one of the silicon particle and the silicon oxide particle. The active material layer constituting the electrode for a nonaqueous electrolyte battery has the plurality of cracks extending in the thickness direction of the active material layer. For these reasons, in the nonaqueous electrolyte battery according to the present embodiment, it is possible to relieve the stress generated by the volume expansion of the active material layer, and also, it is possible to suppress the capacity reduction caused by forming the new coating film made from the nonaqueous electrolyte on the surface of the active material. Also, in the nonaqueous electrolyte battery according to the present embodiment, it is possible to improve the cycle characteristics without deteriorating the energy density per unit volume of the negative electrode.

Third Embodiment

Next, the battery pack according to the 3rd embodiment is described in detail.

The battery pack according to the present embodiment includes at least one nonaqueous electrolyte battery according to the aforementioned 2nd embodiment (i.e. a single battery) as a secondary battery. When the plurality of single batteries is included in the battery pack, the respective single batteries are disposed so as to be electrically connected in series, in parallel, or in series and parallel.

Figure 8:
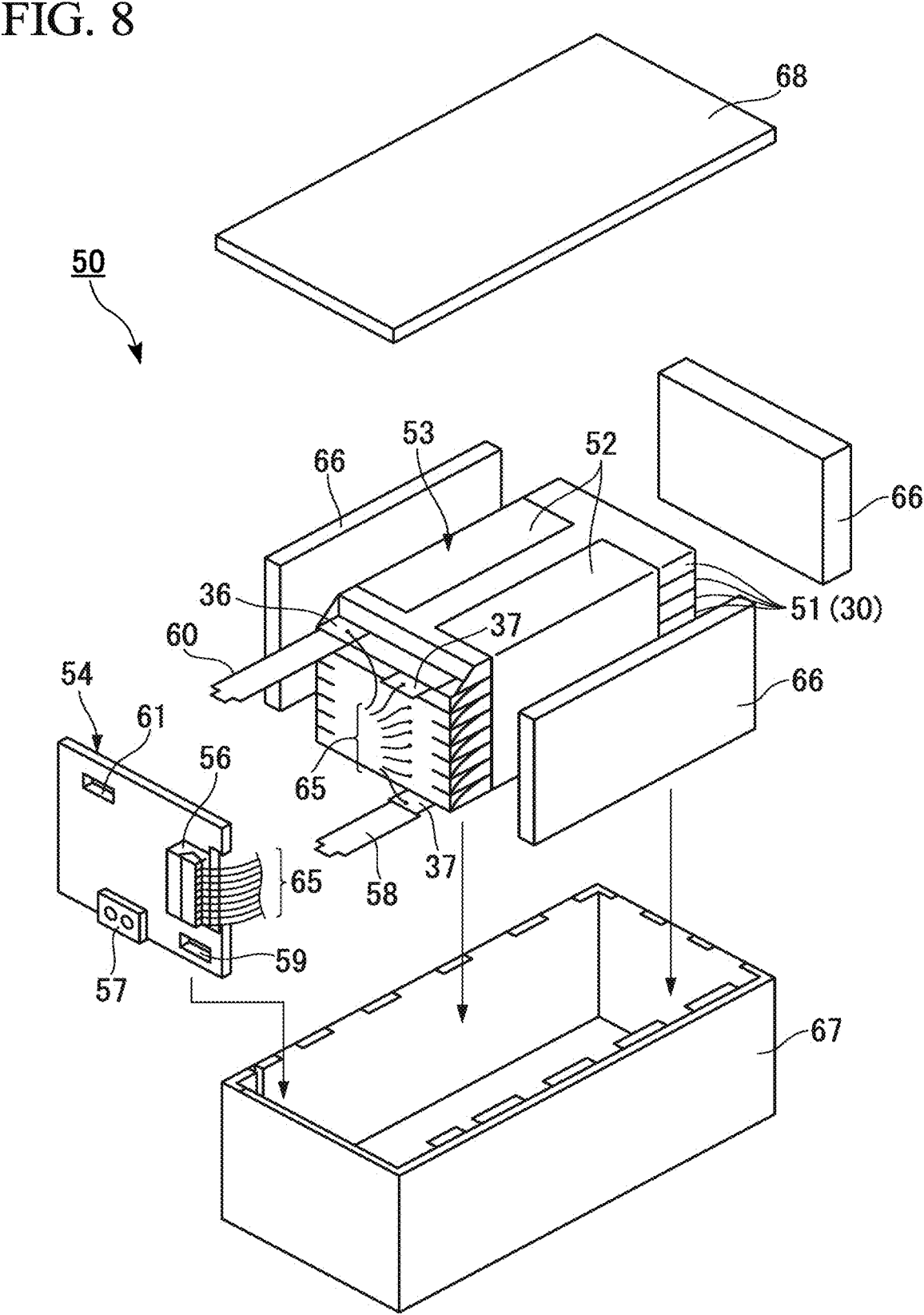
FIG. 8 is a schematic perspective view illustrating the battery pack according to the 3rd embodiment.
Figure 9:
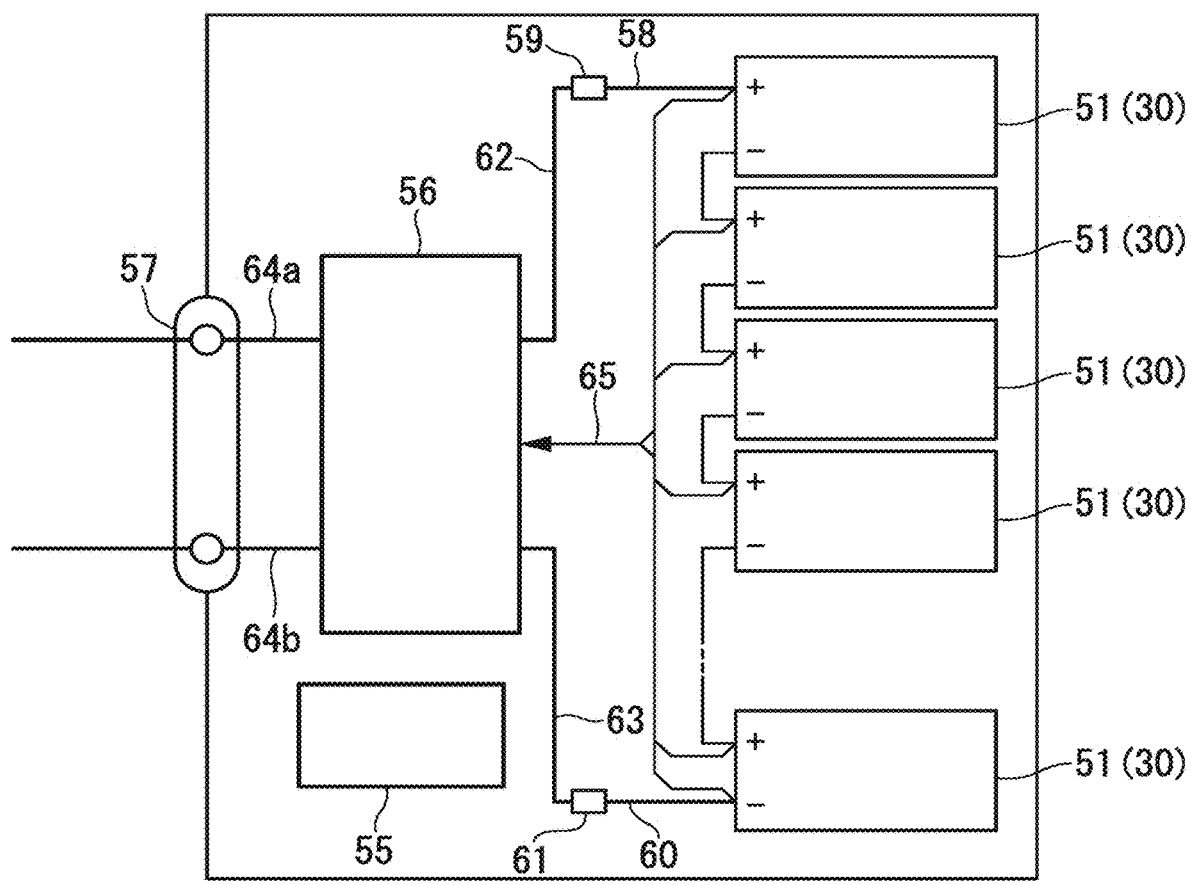
FIG. 9 is a schematic view illustrating the battery pack according to the 3rd embodiment.

Referring to FIG. 8 and FIG. 9, the battery pack 50 according to the present embodiment is described in detail. In the battery pack 50 illustrated in FIG. 8, the flat type nonaqueous electrolyte battery 30 illustrated in FIG. 4 is used as the single battery 51.

The plurality of single batteries 51 are laminated so that the negative electrode terminals 36 and the positive electrode terminals 37 extending to the outside are arranged in the same direction, and thus the assembled batteries 53 are configured by fastening with the adhesive tape 52. These single batteries 51 are connected mutually and electrically in series, as illustrated in FIG. 8 and FIG. 9.

The printed wiring board 54 is disposed to face the side surfaces of the single batteries 51 in which the negative electrode terminals 36 and the positive electrode terminals 37 extend. As illustrated in FIG. 8, the thermistor 55 (see FIG. 9), the protective circuit 56 and the energizing terminal (i.e. energizing external terminal) 57 to an external device are mounted on the printed wiring board 54. Herein, an insulation plate (not illustrated) is mounted on the surface of the printed wiring board 54 facing the assembled batteries 53 in order to avoid unnecessary connection with wirings of the assembled batteries 53.

The positive electrode-side lead 58 is connected to the positive electrode terminal 37 located in the lowermost layer of the assembled batteries 53, and the front end of the positive electrode-side lead 58 is inserted into the positive electrode-side connector 59 of the printed wiring board 54 to be electrically connected. The negative electrode-side lead 60 is connected to the negative electrode terminal 36 located in the uppermost layer of the assembled batteries 53, and the front end of the negative electrode-side lead 60 is inserted into the negative electrode-side connector 61 of the printed wiring board 54 to be electrically connected. These positive electrode-side connector 59 and negative electrode-side connector 61 are connected to the protective circuit 56 via wirings 62 and 63 (see FIG. 9) formed in the printed wiring board 54.

The thermistor 55 is used to detect a temperature of the single battery 51. Although not illustrated in FIG. 8, the thermistor 55 is installed near the single batteries 51, and a detection signal is transmitted to the protective circuit 56. The protective circuit 56 can block the plus-side wiring 64a and the minus-side wiring 64b between the protective circuit 56 and the energizing terminal 57 for an external device under a predetermined condition. Here, for example, the predetermined condition means that the detection temperature of the thermistor 55 becomes equal to or greater than a predetermined temperature. In addition, the predetermined condition also means that an overcharge, overdischarge, overcurrent, or the like of the single battery 51 be detected. The detection of the overcharge or the like is performed for the respective single batteries 51 or all of the single batteries 51. Herein, when the overcharge or the like is detected in the respective single batteries 51, a battery voltage may be detected, or a positive electrode potential or a negative electrode potential may be detected. In the latter case, a lithium electrode used as a reference electrode is inserted into the respective single batteries 51. In the case of FIG. 8 and FIG. 9, wirings 65 for voltage detection are connected to the respective single batteries 51 and detection signals are transmitted to the protective circuit 56 via the wirings 65.

As illustrated in FIG. 8, the protective sheets 66 formed of rubber or resin are disposed on three side surfaces of the assembled batteries 53 excluding the side surface from which the positive electrode terminals 37 and the negative electrode terminals 36 protrude.

The assembled batteries 53 are stored together with the respective protective sheets 66 and the printed wiring board 54 in the storing container 67. That is, the protective sheets 66 are disposed on both of the inner surfaces of the storing container 67 in the longer side direction and the inner surface in the shorter side direction, and also, the printed wiring board 54 is disposed on the inner surface opposite to the protective sheet 66 in the shorter side direction. The assembled batteries 53 are located in a space surrounded by the protective sheets 66 and the printed wiring board 54. The cover 68 is mounted on the upper surface of the storing container 67.

When the assembled batteries 53 are fixed, a thermal shrinkage tape may be used instead of the adhesive tape 52. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, in FIG. 8 and FIG. 9, the single batteries 51 connected in series are illustrated. However, to increase a battery capacity, the single batteries 51 may be connected in parallel or may be connected in a combination form of series connection and parallel connection. The assembled battery packs can also be connected in series or in parallel.

According to the aforementioned present embodiment, it is possible to provide the battery pack. The battery pack according to the present embodiment includes at least one of the aforementioned nonaqueous electrolyte battery according to the 2nd embodiment.

In this kind of battery pack, it is possible to improve the cycle characteristics without deteriorating the energy density per unit volume of the negative electrode.

Herein, the form of the battery pack can be appropriately modified according to a use application. A use application of the battery pack according to the embodiment is preferably one which is required to show excellent cycle characteristics when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the battery pack using the nonaqueous electrolyte batteries with excellent high temperature characteristics is appropriately used for vehicles.

EXAMPLES

Hereinafter, the aforementioned embodiments are described on the basis of the examples.

Example 1

In order to obtain the negative electrode active material, the silicon particle and the carbonaceous material were complexed under the following conditions, to thereby produce the complex containing the silicon particle and the carbonaceous material.

As the silicon particle, the powder having an average particle diameter of 40 nm was used.

In the mixed solution prepared by dissolving the resol-type phenolic resin 1.75 g in ethanol 10 g, the silicon particles 1.25 g and the $ZrO_2$ balls having a diameter of 0.2 mm were added and subjected to the crushing and mixing treatment with a planetary ball mill, to thereby prepare the slurry.

The slurry was filtered under a reduced pressure so as to remove the $ZrO_2$ balls. Then, the slurry was dried at 80° C. and subjected to the heating and curing treatment at 150° C. for 2 hours, to thereby obtain the mixture of the silicon particles and the carbon precursor.

The mixture was put in the electric furnace, and heated and fired at 1,000° C. for 3 hours in an argon gas atmosphere.

The obtained complex was crushed, and passed through a sieve having a mesh size of 20 μm, to thereby obtain the negative electrode active material.

This negative electrode active material 0.6 g and the graphite powder 0.1 g having an average particle diameter of 3 μm were added in the solution produced by dissolving polyimide 16 wt % in N-methylpyrrolidone, and the mixture was mixed by using a mixer, to thereby prepare the pasty slurry.

This slurry was applied and rolled on the copper foil having a thickness of 12 μm, and then, was subjected to the heat treatment at 400° C. for 2 hours in an argon gas atmosphere.

The obtained the copper foil coated with the negative electrode active material layer was folded by the rod-shaped roller having a diameter of 5 mm such that the negative electrode active material layer was placed on the outside, and the tensile force is applied in the width direction of the negative active material layer (the direction perpendicular to the thickness direction of the negative electrode active material layer), to thereby form the cracks along the thickness direction of the negative electrode active material layer.

Thereafter, the copper foil coated with the negative electrode active material layer was cut to a size of 20 mm×20 mm, and dried in vacuum at 100° C. for 12 hours, to thereby obtain the test electrode of Example 1.

Example 2

The test electrode of Example 2 was produced in exactly the same manner as Example 1 except for using the rod-shaped roller having a diameter of 10 mm as the rod-shaped roller for folding the negative electrode active material layer.

Example 3

The test electrode of Example 3 was produced in exactly the same manner as Example 1 except that the copper foil coated with the slurry, which was prepared by using the polyamide-imide as the binder and applying the slurry on the copper foil, was just dried, and the heat treatment was not carried out.

Example 4

The test electrode of Example 4 was produced in exactly the same manner as Example 1 except that the copper foil coated with the slurry, which was prepared by using the polyacrylic acid as the binder and applying the slurry on the copper foil, was just dried, and the heat treatment was not carried out.

Comparative Example 1

The test electrode of Comparative Example 1 was produced in exactly the same manner as Example 1 except that the cracks were not formed in the negative electrode active material layer.

Comparative Example 2

The test electrode of Comparative Example 2 was produced in exactly the same manner as Example 1 except for using the rod-shaped roller having a diameter of 15 mm as the rod-shaped roller for folding the negative electrode active material layer.

[Evaluation of Electrochemical Characteristics]
(Preparation of Nonaqueous Electrolyte Solution)

Ethylene carbonate (EC) and diethyl carbonate (DEC) were respectively mixed at the volume ratio of 1:2, to thereby prepare the mixed solvent. $LiPF_6$ was dissolved in this mixed solvent, to thereby prepare the nonaqueous electrolyte solution.

(Production of Nonaqueous Electrolyte Battery)

The aforementioned test electrode, the Li metal which was a counter electrode and a reference electrode, and the aforementioned nonaqueous electrolyte solution were respectively housed in the bottomed container, to thereby produce the half-cell of the nonaqueous electrolyte battery. The assembly of the battery was carried out in the glove box filled with argon.

(Charge and Discharge Test)

In the charge and discharge test, the charge was carried out at a constant current density of 0.5 mA/cm² until the potential difference between the reference electrode and the test electrode became 0.01 V, and moreover, the charge was carried out at a constant voltage of 0.01 V until the constant current density became 0.025 mA/cm². The discharge was carried out at a constant current density of 0.25 mA/cm² until the potential difference became 1.5 V. The ratio of the discharge capacity to the charge capacity in this process was defined as the first-time charge and discharge efficiency.

The cross-sectional surface along the thickness direction of the test electrode was observed by a scanning electron microscope.

Figure 10:
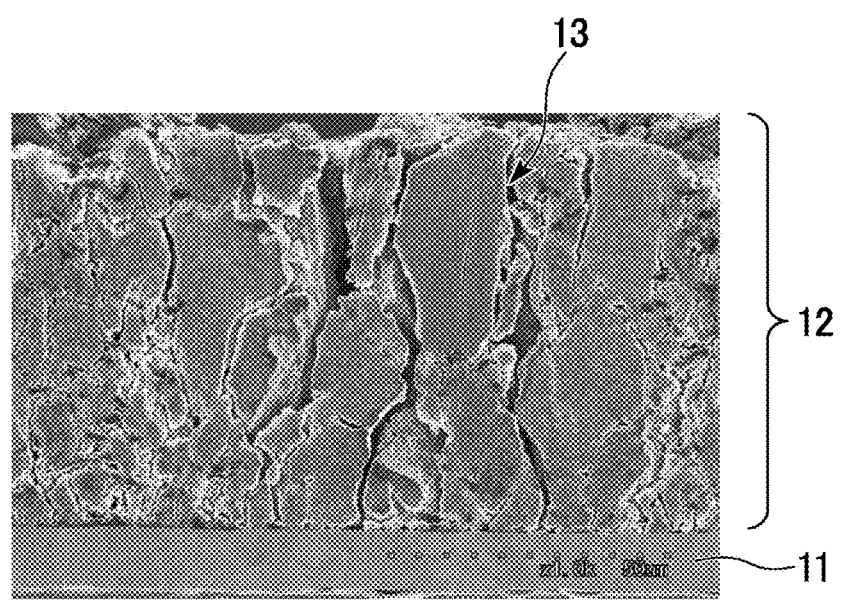
FIG. 10 is the scanning electron microscope (SEM) image showing the cross-sectional surface along the thickness direction of the test electrode of Example 1.

FIG. 10 is the scanning electron microscope (SEM) image showing the cross-sectional surface along the thickness direction of the test electrode of Example 1. From this electron microscope image, a plurality of cracks 13 extending in the thickness direction of the negative electrode active material layer 12 was confirmed. The cracks 13 have been formed from the upper surface of the negative electrode active material layer 12 (the opposite surface to the surface contacting the negative electrode current collector (copper foil) 11) to the lower surface thereof (the surface contacting the negative electrode current collector 11). Also, the separation of the negative electrode active material layer 12 and the negative electrode current collector 11 was not observed at the interface between the negative electrode active material layer 12 and the negative electrode current collector 11. Also, on the cross-sectional surface along the thickness direction of the negative electrode active material layer 12, 6 pieces of cracks 13 existed per 100 μm width of the active material layer 12. Moreover, a plurality of cracks 13 was subjected to the measurement of the size of the gap (width), and it was found that the respective gaps were 5 μm or less.

The crack described herein means the opening part formed over no less than one-third of the thickness of an electrode.

The number of the cracks can be measured by cutting the test electrode at the cross-section, which passes by the center of the opposite surface (upper surface) to the surface of the negative electrode active material layer contacting the negative electrode current collector and is perpendicular to this upper surface, and observing the obtained cross-sectional surface by a scanning electron microscope. The cracks are formed in a planar shape, and thus, the number of the cracks was not measured from only a single cross-sectional surface, but was measured from at least 5 cross-sectional surfaces. Then, the average value thereof was defined as the number of the cracks in the cross-section along the thickness direction of the negative electrode active material layer.

Also, the gap (width) of the crack is defined as the widest part of the crack on the observed surface when focusing a single crack. Also, it is possible to observe the entire image of the crack by observing the negative electrode active material layer through X-ray CT scanning, etc.

In the test electrode of Example 2, 2 pieces of cracks extending in the thickness direction of the negative electrode active material layer existed per 100 μm width of the negative electrode active material layer on the cross-sectional surface which was along the thickness direction of the negative electrode active material layer. Also, a plurality of cracks was subjected to the measurement for the size of the gap (width), and it was found that the size was 5 μm at a maximum.

On the other hand, in the test electrode of Comparative Example 1, even a single crack was not observed in the negative electrode active material layer.

Also, in the test electrode of Comparative Example 2, the cracks existed in the negative electrode active material layer, but all the lengths of the cracks were less than one-third of the thickness of the test electrode.

Next, the results of the charge and discharge tests are described.

In Example 1, the initial rise of the charge and discharge efficiency was rapid during the charge and discharge cycles, and reached 99.7% even at 3rd cycle. This value was maintained even thereafter.

In Example 2, the charge and discharge efficiency exceeded 99.5% at 6th cycle, and this value was maintained even thereafter.

By contrast, in Comparative Example 1, the initial rise of the charge and discharge efficiency was slow during the charge and discharge cycles, and was below 99.5% even at 10th cycle. Thereafter, the charge and discharge efficiency was temporarily reduced, and with this reduction, the capacity was significantly reduced. Thereafter, the charge and discharge efficiency was improved again. It can be considered that this was because the new cracks were generated in the negative electrode material layer by the volume expansion caused by the charge and discharge, and the electrolyte solution entered through these cracks, which formed the coating film (SEI layer).

In the test electrodes of Example 1 and Example 2, the cracks were preliminarily formed, and it can be considered that these cracks relieved the stress caused by the volume expansion, and the effect of the formation of new cracks was limited. From these results, it was found that, by preliminarily forming the cracks along the thickness direction of the negative electrode active material layer, it was possible to suppress the capacity reduction during the cycle process, especially in the initial stage of the cycles, and to provide the nonaqueous electrolyte battery having a long cycle life.

In Examples 3 and 4, the separation of the negative electrode active material layer and the negative electrode current collector was not observed at the interface between the negative electrode active material layer and the negative electrode current collector in the same manner as in Example 1 and Example 2 in which the polyimide was used as a binder. Also, the cracks extending in the thickness direction of the negative electrode active material layer was formed.

Also, the cycle characteristics obtained in Examples 3 and 4 were equivalent to the cycle characteristics obtained in Example 1. It was found that the stress caused by the volume expansion was relieved in the initial cycle stage, and the cycle characteristics could be improved even when the polyamide-imide or the polyacrylic acid was used as the binder.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrode for a nonaqueous electrolyte battery comprising:
  a current collector; and
  an active material layer which includes an active material and is formed on the current collector,
  wherein the active material layer includes a carbonaceous material and at least one of a plurality of silicon particles and a plurality of silicon oxide particles dispersed in the carbonaceous material,
  wherein the active material layer has a plurality of cracks extending in a thickness direction of the active material layer,
  wherein each of the plurality of cracks separates a first inner surface area of the active material layer and a second inner surface area of the active material layer along a two-dimensional plane perpendicular to the thickness direction of the active material layer, wherein the first inner surface area is opposed to the second inner surface area,
  wherein the first inner surface area includes a first set of a plurality of silicon particles and a plurality of silicon oxide particles, the second inner surface area includes a second set of a plurality of silicon particles and a plurality of silicon oxide particles, and wherein each of the particles in the first set is separated from each and every one of the particles in the second set by at least 0.5 μm,
  wherein a length of at least one of the plurality of cracks is no less than one-third of a thickness of the electrode,
  wherein a width of the at least one of the plurality of cracks in the direction perpendicular to the thickness direction of the active material layer is 0.5 μm or more and 10 μm or less, and
  wherein the at least one of the plurality of cracks is formed in a planar shape.

2. The electrode according to claim 1, wherein
a length of the cracks extending in the thickness direction of the active material layer are random,
the length of the crack is no less than one-third of a thickness of the electrode,
at least 2 pieces of cracks exist per 100 μm width of the active material layer in a cross-section which passes by a center of an opposite surface to a surface of the active material layer contacting the current collector and is along the thickness direction of the active material layer.

3. The electrode according to claim 1, wherein the active material is a complex containing a carbonaceous material and at least one of the silicon particle and the silicon oxide particle.

4. The electrode according to claim 1, wherein the active material layer includes a binder made of at least one selected from the group consisting of a polyamic acid, a polyamide-imide, a polyimide, a polyaramide, a polyacrylic acid, a polyvinylidene fluoride, a styrene-butadiene rubber and a carboxymethyl cellulose.

5. A nonaqueous electrolyte battery comprising:
an exterior material;
a positive electrode that is housed in the exterior material;
a negative electrode that is spatially separated from the positive electrode and is housed in the exterior material with a separator interposed therebetween; and
a nonaqueous electrolyte in the exterior material, wherein the negative electrode is the electrode according to claim 1.

6. A battery pack comprising one or more of the non-aqueous electrolyte battery according to claim 5.

7. The battery pack according to claim 6, further comprising: an energizing external terminal; and a protective circuit.

8. The battery pack according to claim 6, wherein the nonaqueous electrolyte batteries are connected in series, in parallel or with a combination of series connection and parallel connection.

9. The electrode according to claim 1, wherein the crack has a linear shape in the direction perpendicular to the thickness direction of the active material layer.

10. The electrode according to claim 1, wherein the crack has a large size of length compared with a size of width direction, in the direction perpendicular to the thickness direction of the active material layer.

* * * * *